United States Patent [19]

Vogg

[11] Patent Number: 4,617,180

[45] Date of Patent: Oct. 14, 1986

[54] PROCESS FOR PURIFYING FLUE GAS

[75] Inventor: Hubert Vogg, Karlsruhe, Fed. Rep. of Germany

[73] Assignee: Kernforschungszentrum Karlsruhe GmbH, Karlsruhe, Fed. Rep. of Germany

[21] Appl. No.: 617,941

[22] Filed: Jun. 6, 1984

[30] Foreign Application Priority Data

Jun. 7, 1983 [DE] Fed. Rep. of Germany ....... 3320466
Jul. 5, 1983 [DE] Fed. Rep. of Germany ....... 3324133

[51] Int. Cl.$^4$ .............................................. B01D 53/00
[52] U.S. Cl. .................................... 423/240; 423/242; 423/215.5; 423/234; 423/92; 423/98; 423/101; 423/109; 423/140; 423/150; 75/101 R; 75/108; 55/37; 55/51; 55/71; 55/72; 55/228; 55/233; 55/DIG. 30
[58] Field of Search .................. 55/37, 51, 71, 72, 228, 55/233, DIG. 30; 423/103, 92, 101, 109, 240 R, 240 S, 241, 215.5, 234, 242, 243, 98, 140, 150

[56] References Cited

U.S. PATENT DOCUMENTS

| | | | |
|---|---|---|---|
| 3,789,109 | 1/1974 | Lyon et al. | 423/240 R |
| 3,791,812 | 2/1974 | Frank et al. | 423/240 R |
| 3,969,482 | 7/1976 | Teller | 423/240 R |
| 4,013,455 | 3/1977 | Kleeberg et al. | 423/240 R |
| 4,124,462 | 11/1978 | Reinhardt et al. | 423/240 R |
| 4,297,332 | 10/1981 | Tantani et al. | 423/240 R |

OTHER PUBLICATIONS

*Abfallwirthschaft an der TU Berlin,* vol. 7, pp. 1–41.

Primary Examiner—John Doll
Assistant Examiner—Bob Stoll
Attorney, Agent, or Firm—Spencer & Frank

[57] ABSTRACT

The present invention relates to a process for purifying flue gases developed during the combustion of waste materials and containing solids of various compositions as well as pollutant gases and heavy metals in gaseous form, wherein the primarily solid components are removed from the flue gas in a separating system and are collected as flue ashes and wherein the flue gas is washed for the purpose of binding the pollutant gases of the residual solids components, particularly in the slag.

It is the object of the present invention to provide a process wherein, during flue gas purification, the gaseous heavy metal contaminants as well as the heavy metal contaminants which are present in the flue ash and in the slag in soluble form, can be removed from the flue gas purification process in the most compact form, with simultaneously achieving good, or even improved, initial purification of HCl, $SO_2$. $NO_x$. All other residues should be returnable for further use. The remainder of heavy metal components which are not bound in the slag are isolated from the slag by a subsequent weakly acid treatment.

11 Claims, 3 Drawing Figures mass balance for heavy metals

PROCESS FOR PURIFYING FLUE GAS

BACKGROUND OF THE INVENTION

In a flue gas purification system, the solid, liquid or gaseous pollutants are separated from the flue gas with the aim of reducing damage to the environment to an acceptable degree. In principle, the separation of polluting particulates, from flue gas is effected by mechanical and electrical processes, as well as by the wet dust removal processes such as absorption, adsorption and chemosorption. Basic methods for gaseous pollutant removal from flue gas are absorption, adsorption, condensation and chemical reaction processes. The wet scrubbing processes produce sludges, dissolved solids and waste water.

Frequently flue gas purification systems combine several basic principles into one overall process. One of the most popular refuse burning processes for treating, for example, municipal waste, provides for the removal of particulates from flue gas by means of electrostatic filters or fabric filters and the partial removal of the gaseous pollutants HCl, $SO_2$, and HF from the flue gas by means of acid or alkali treatment, either upstream or downstream from the filter system (Abfallwirtschaft an der TU Berlin [Waste Treatments at the Technical University of Berlin], Volume 7, pages 1–41). Heavy metals present in gaseous form, e.g. Hg, and organic contaminants, e.g. chlorinated dioxins, have so far only been reliably removed by wet processes downstream from the filters.

The mass-balance for the most important heavy metals in municipal refuse is illustrated in FIG. 3. The composition of the flue gas before purification is given in Tab. 1. An extreme drawback of the conventional methods is the fact that about 30 kg of smoke particulates having high halogen contents are produced for each ton of refuse burned. These particulates also contain heavy metal substances, sometimes in easily transported form. For this reason, the use of particulates from flue gas solids removal systems is decreasing steadily, and it is believed that such materials should only be stored in special depositories under strict safety regulations. The safe removal of the heavy metal contaminants from the ecosystem is nevertheless not assured, particularly with a view toward long-term storage. A primary problem with respect to the contaminants Hg, Cd, Pb, Sb, Sn, Zn, and others in flue ash, in flue gas, and in refuse from combustion systems continues to exist.

SUMMARY OF THE INVENTION

It is, therefore, the object of the present invention to provide a process by which gaseous heavy metal contaminants from flue gas, primarily heavy metal contaminants present in soluble form, are removed from the flue gas purification process in the most concentrated form possible,

TABLE 1

|  | Flue gas before purification \|mg/Nm$^3$\| | Flue gas after purification \|mg/Nm$^3$\| | Yield \|%\| |
|---|---|---|---|
| HCl | 1000 | 20 | 98 |
| SO$_2$ | 500 | 150 | 70 |
| Dust | 5000 | 20 | >99 |
| Hg | 0.4 | 0.1 | 75 |
| Cd | 1.5 | 0.04 | 97 |
| Zn | 75 | 1.5 | 98 |
| Pb | 25 | 0.5 | 98 |

TABLE 1-continued

|  | Flue gas before purification \|mg/Nm$^3$\| | Flue gas after purification \|mg/Nm$^3$\| | Yield \|%\| |
|---|---|---|---|
| Sb | 3 | 0.05 | 98 | while simultaneously achieving good or improved removal of HCl, $SO_2$, and $NO_x$. All other residues should be able to be recycled or recovered.

We have developed a process for purifying the flue gas produced during the combustion of waste materials which contains solid particulates of various compositions, as well as contaminating gases and heavy metal vapors. The majority of the solid components are removed from the flue gas in a dry separation system and collected as flue ash, which ash is purified by acid leaching to remove soluble heavy metals. The flue gas is thereafter scrubbed to remove the remaining solid components and washed to remove contaminating gases. In the process according to the invention, flue gas leaving the dry separation system passes to a condensation/washing system, where the water vapor contained in the flue gas, the HCl, and any heavy metal vapors are separated by condensation, and the condensate is used to extract soluble heavy metals from the flue gas particulates. The soluble heavy metals are then subjected to a precipitation reaction to remove them from the process. The recovered heavy metals may be reclaimed, and the other residues may be returned to the combustion chamber to be made inert by reacting with the slag at high temperatures to become fixed therein.

DESCRIPTION OF THE PREFERRED EMBODIMENTS

In the process according to the present invention, care is taken in order to protect the environment. Gaseous pollutants such as HCl, $SO_2$, $NO_x$, particulates, metal vapors such as Hg, and the soluble heavy metal contaminants contained in flue gas particulates and slag from combustion systems can be eliminated, such that only inert and fixed components remain which are combined with the combustion slag in such a manner that long-term stability and safe reuse or removal are assured. Although the process according to the invention employs wet-chemical flue gas purification processes, they are designed to operate with a minimum of water consumption and to meet the requirements for purification of the actual gas phase, to dissolve flue ash contaminants and to keep the ash pure.

In comparison to conventional processes the in-line water consumption is about 50%. The purification yield in the flue gas is given in Tab. 1. The acid leaching process of the fly ash removes the mobile portions of heavy metals down to a scale demonstrated in Tab. 2.

TABLE 2

| | Fly ash before leaching /ppm/ | Fly ash after leaching /ppm/ | Yield /%/ |
|---|---|---|---|
| Cd | 280 | 40 | 85 |
| Cu | 1100 | 1000 | 10 |
| Ni | 140 | 100 | 30 |
| Pb | 5300 | 5000 | 5 |
| Sb | 580 | 560 | 3 |
| Zn | 16000 | 8000 | 50 |

The novelty of the present invention lies in its use of process steps which produce about 1 kg ash residue containing heavy metals for each ton of refuse processed, as opposed to about 30 kg of flue ash residue containing less concentrated heavy metal produced for each ton processed by prior art methods that can only be decontaminated with difficulty at storage locations. The 1 kg/ton residue produced according to this invention essentially corresponds to the actual quantity of heavy metal contaminants that are removed directly from the process. In the case of mercury, lead, or cadmium recovery, for example, by producing sulfides of these metals, it is even possible to completely eliminate the metals without any residue.

As precipitation agents $Na_2S$ or less bad smelling TMT ($C_3H_3N_3S_3$) can be used.

As an example the chemical equation for the precipitation of mercury is the following:

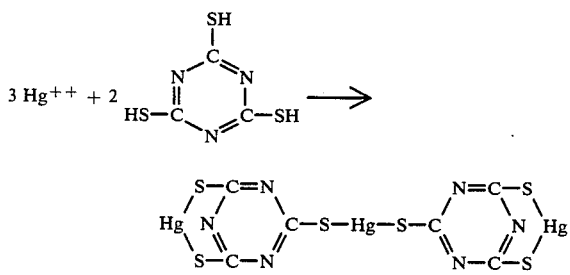

The precipitation yield is 99%.

The procedures employed for disposing of dissolved solids in waste water from the process depend on the particular location. Normally, such waste water can be discharged without objection to a sewer, as it is free of heavy metals. If a sewer is not at hand, another advantageous removal variation is available which applies to flue ash as well as to dissolved solids, e.g. bitumenization.

Figure 1:
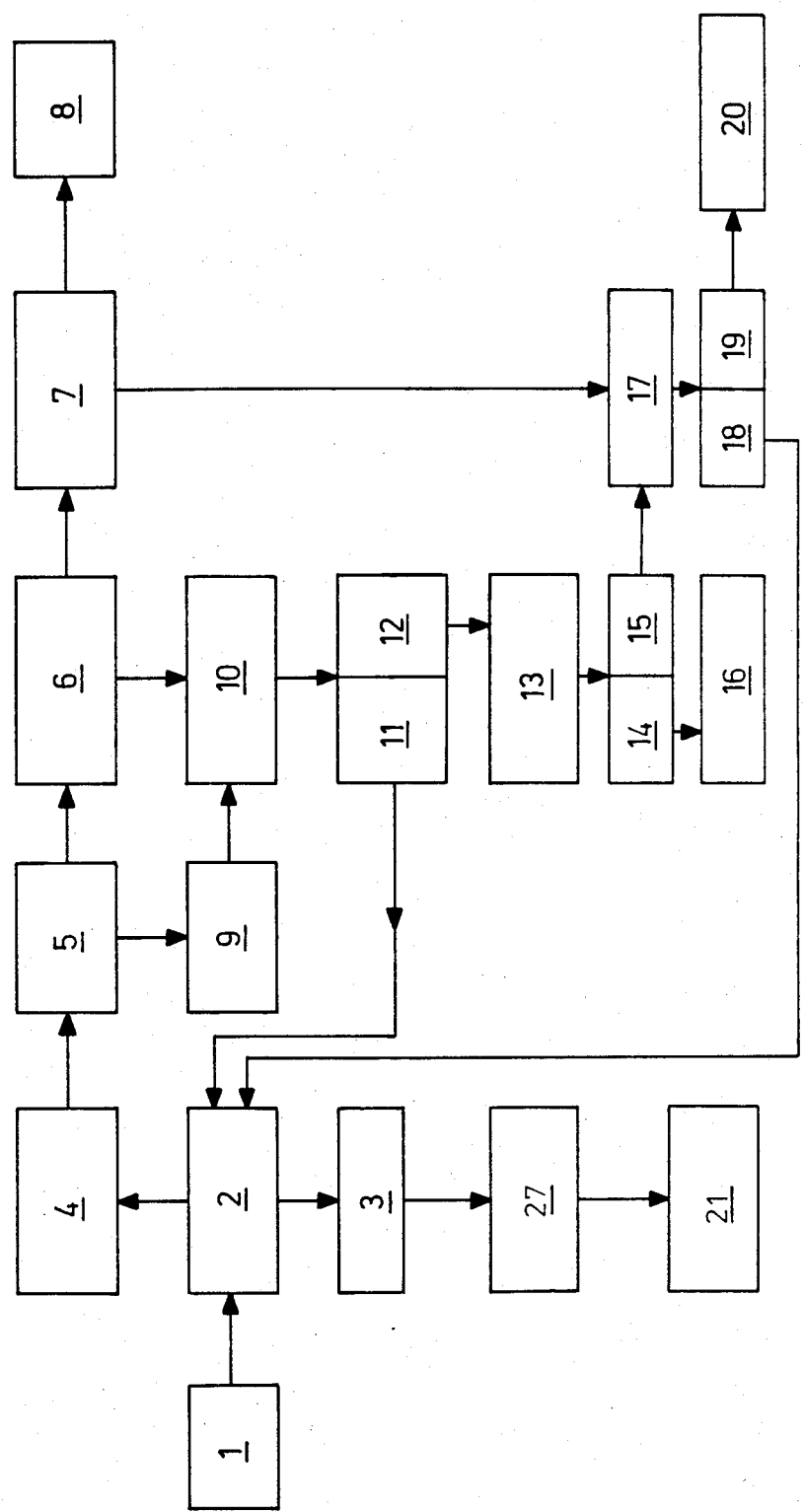
FIG. 1 is a block flow diagram of the process according to the invention, wherein the liquid streams from condensing, washing, and quenching are ultimately discharged at a sewer or a waste water treatment system.
Figure 2:
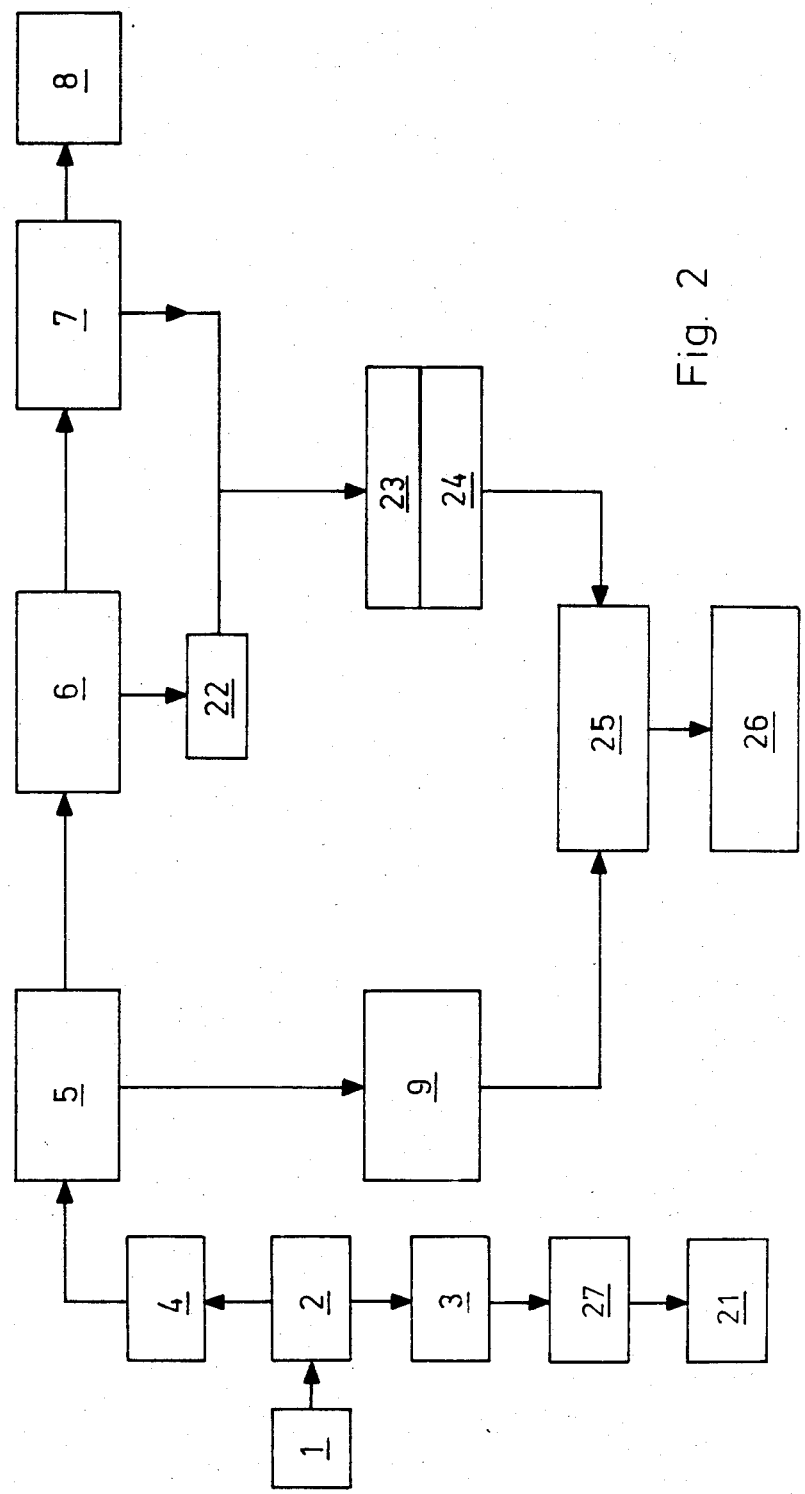
FIG. 2 is a block flow diagram of the process wherein waste water containing dissolved solids cannot be discharged and methods for precipitation, evaporation, and fixing in an inert solid mass are employed.

The present invention will now be described in greater detail with the aid of two embodiments which are illustrated in FIGS. 1 and 2.

FIG. 1 is a schematic representation of one embodiment of the process according to the present invention. Refuse 1 is fed into combustion system 2 and burned. This produces heat, together with flue gas and slag 3. Part of the heat is recovered from the flue gas in a heat exchanger system 4, and used for other purposes. Following this heat recovery, the flue gas is selectively subjected to dry prepurification by means of a cyclone or electrostatic filter 5 at about 180° C. Care must be taken, both during prepurification and during heat recovery, to be sure that the temperature does not drop below the dew point for any of the components of the flue gas, such as water vapor or the like.

For the gases and vapors passing through the filter or the cyclone, the dry prepurification process 5 is followed by a condensation/scrubbing process 6, in which water vapor is condensed and HCl, Hg, and particulates are simultaneously removed. The remaining residual flue gas, containing the pollutant gas components $SO_2$ and $NO_x$, is then subjected to an alkali wash 7 and the clean gas is conducted to stack 8.

The washing condensate from the condensation process 6 is combined with the flue ash 9 in reactor 10 to partially dissolve the heavy metals and extract them from the flue ash 9. This may include a mechanical mixing process, wherein the acid washing condensate containing HCl reacts with the alkali flue ash to result in a final pH of about 3.

Reactor 10 is followed by solid-liquid separation, e.g., sedimentation or centrifuging. The result is a solid residue 11 and a solution 12 essentially composed of the washing condensate (primarily HCl and Hg) and the dissolved heavy metals removed from the flue ash 9. The solid residue 11 is advantageously returned to the combustion system 2 by feeding it to the refuse in order to be bind it into the hotslag during the incineration process so that, at the high temperatures therein, it is stabilized by being bound within the slag 3.

Following solid-liquid separation, acidic solution 12 is subjected to heavy metal precipitation 13, preferably sulfide precipitation. After a second solid-liquid separation, the heavy metals are recovered in a compact form 14 as a solid precipitate and are available for possible recycling 16. The acid solution 15, the supernatant from the heavy metal precipitation, is combined with the alkali wash solution 7 for the purpose of neutralization in neutralization system 17.

The clarification sludge 18, formed during neutralization 17, is preferably returned to the combustion system 2 and where it is stabilized by being bound within the slag 3 by means of high temperatures. This slag 3 is available for reuse 21, e.g. for road construction.

If the slag 3 contains heavy metal components which are not bound and stabilized during high temperature treatment in spite of suitable conditions, and which could be washed out, a subsequent treatment is conducted. This treatment comprises a weak acid treatment of the slag 3, which is effected at a pH of about 4. In an advantageous manner, bath 27 is suitable for this subsequent treatment in which slag 3 is generally quenched or cooled after it leaves combustion system 2. Bath 27 consists of water. However, it is also conceivable to spray the slag 3 with a weak acid mist and to collect the developing quenching liquid and remove the heavy metals by precipitation, as above.

The clarified solution 19, containing dissolved chloride and sulfate salts but free from heavy metal contaminants, having had clarification sludge 18 removed during the neutralization process 17, is discharged into a sewer 20 to remove these salts from the system.

If discharging clarified solution 19 containing dissolved chlorides and sulfates and, perhaps, residual heavy metal contaminants, to a sewer 20 is not possible for engineering or legal reasons, a completely different removal variation for decontamination can be employed according to the embodiment of FIG. 2 of the present invention. For this purpose, the washing condensate from the condensation process 6 is mixed with a precipitation agent 22, e.g. sulfide, to precipitate any heavy metals, primarily any Hg contained therein, and is combined with the alkali wash solution 7 for the purpose of neutralization 23. In a deviation from the first embodiment, the resulting suspension, which includes the precipitated heavy metals, is subjected to evaporation crystallization 24. The crystalline wastes are stabilized by fixing, possibly together with the flue ash 9, in an inert matrix, e.g. as customary in the nuclear energy art, by bitumenization 25. The waste is then removed to a storage depot 26.

EXAMPLE 1

For the condensation process 6

In a large-scale combustion system, 1.12 m$^3$ flue gas was extracted after passing through the electrostatic filter and 140 cm$^3$ H$_2$O was condensed out therefrom at room temperature. The condensed HCl quantity was 1004 mg/m$^3$ waste gas, that is 95% of the entire amount of HCl present. Together with the H$_2$O and HCl, 98 Hg/m$^3$ waste gas were also condensed, that is 78% of the total amount of Hg.

EXAMPLE 2

For the elution behavior of flue ashes in reactor 10. Ratio solvent H$_2$O to flue ashes=100:1 temperature 20° C.

| soluble components /%/ | pH = 10 | pH = 3 |
| --- | --- | --- |
| As | 3.6 | 5.4 |
| Cd | — | 85 |
| Co | — | 20 |
| Cu | — | 10 |
| Ni | — | 30 |
| Pb | 0.1 | 4.6 |
| Sb | 1.4 | 3.0 |
| Zn | 0.01 | 53 |

EXAMPLE 3

Leaching behavior of slag in reactor 3

| most important components /%/ | pH = 8 | pH = 4 |
| --- | --- | --- |
| Zn | 0.01 | 4 |
| Pb | n.d. | 2 |
| Cd | n.d. | 25 | n.d. = non detectable

EXAMPLE 4

Composition of the flue gas after purification see Tab. 2.

EXAMPLE 5

Figure 3:
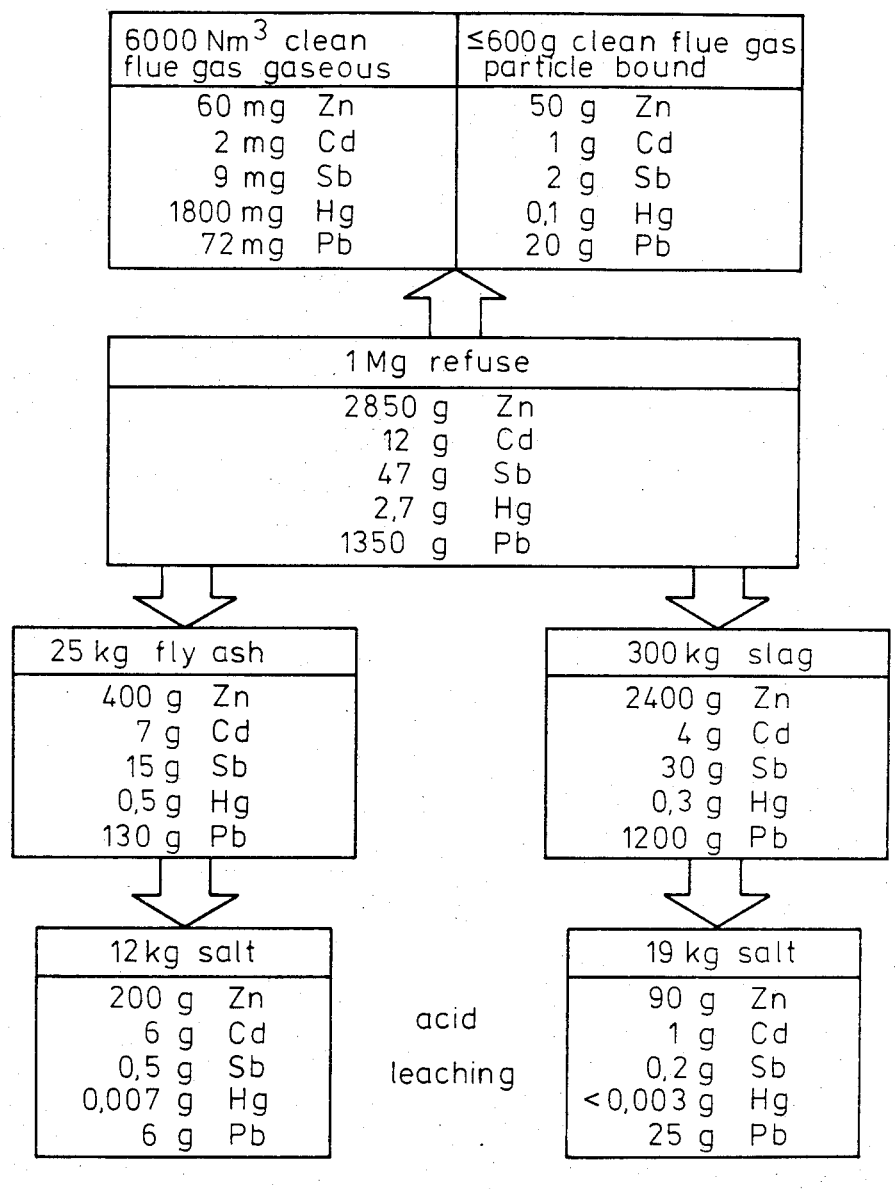
FIG. 3 shows the mass-balance for the heavy metals.

Overall recovery of heavy metals see FIG. 3

| | | |
| --- | --- | --- |
| Zn | 10% | |
| Cd | 60% | |
| Pb | 2-3% | |

The main goal of the leaching process according to the invention is the depletion of the mobile portions of heavy metals, especially of the toxic Cd. A depletion of 60% for this element is achieved.

EXAMPLE 6

Stability and Inertness of fly ash and slag after acid leaching (reactor 10/3)

An additional second acid leaching test leads to the following elution rates:

| | fly ash | slag |
| --- | --- | --- |
| Zn | <1% | <1% |
| Cd | <1% | <1% |
| Pb | n.d. | n.d. |
| Sb | n.d. | n.d. |
| Ni | n.d. | n.d. |

EXAMPLE 7

Heavy metal waste water analysis after neutralization (step 19)

| | | |
| --- | --- | --- |
| Zn | 0.5 | mg/l |
| Cd | 0.02 | mg/l |
| Pb | 0.5 | mg/l |
| Cu | 0.1 | mg/l |
| Hg | 0.05 | mg/l |

I claim:

1. An improved process for purifying flue gas from the combustion of waste materials and recovering slag and heavy metals in a compact and concentrated form, said flue gas comprising solid particulates of various compositions, polluting gases, water vapor and heavy metal vapors, wherein the majority of solid particulates are removed in a dry solids separation system and collected as flue ash, and wherein the remaining solid particulates and the polluting gases are removed by scrubbing, comprising the improvement of:
    a. condensing water vapor, HCl and heavy metal vapors from the flue gas after leaving the dry separation system in a condensation/scrubbing system which forms an acid condensate solution having a pH of 4 or less and which scrubs the remaining solid particulates from the flue gas;
    b. washing the flue gas previously rendered free of particulates, condensate and heavy metals in the condensing step with an alkali wash solution to remove polluting gases and thereby provide a flue gas purified of combustion waste materials;
    c. extracting at least 37.2 percent by weight of soluble heavy metals from the flue ash with the acid condensate solution from the condensing step to produce a purified flue ash;
    d. precipitating the soluble heavy metals extracted from the flue ash and the soluble heavy metals contained in the acid condensate solution by reaction thereof with a precipitation agent;
    e. separating out the precipitated heavy metals in a solid-liquid separation system, whereby the soluble heavy metals are recovered in a compact and concentrated form; and
    f. neutralizing the acid condensate solution after precipitation of heavy metals therefrom by combining it with the alkali wash solution.

2. The process recited in claim 1, including the further step of recycling for reuse the recovered soluble heavy metals.

3. The process recited in claim 1, including the further step of discharging the solution remaining after neutralization into a sewer system.

4. The process recited in claim 1, including the further step of binding the solution remaining after neutralization within an inert matrix.

5. The process recited in claim 1, including the further step of binding the purified flue ash within an inert matrix.

6. The process recited in claim 1, wherein the process includes the further step of extracting soluble heavy metals not bound and stabilized within the slag from the slag by treatment with a weak acid.

7. The process recited in claim 6, including the further step of quenching the slag in a bath simultaneously with the extraction thereof by treatment with a weak acid.

8. The process recited in claim 1, wherein the precipitation agent is a sulfide.

9. The process recited in claim 1, wherein one kg or less of separated, precipitated heavy metals are recovered per ton of waste materials combusted.

10. An improved process for purifying flue gas from the combustion of waste materials and recovering slag and heavy metals in a compact and concentrated form, said flue gas comprising solid particulates of various compositions, polluting gases, water vapor and heavy metal vapors, wherein the majority of solid particulates are removed in a dry solids separation system and collected as flue ash, and wherein the remaining solid particulates and the polluting gases are removed by scrubbing, comprising the improvement of:

a. condensing water vapor, HCl and heavy metal vapors from the flue gas after leaving the dry separation system in a condensation/scrubbing system which forms an acid condensate solution having a pH of 4 or less and which scrubs the remaining solid particulates from the flue gas;

b. washing the flue gas previously rendered free of particulates, condensate and heavy metals in the condensing step with an alkali wash solution to remove polluting gases and thereby provide a flue gas purified of combustion waste materials;

c. extracting at least 37.2 percent by weight of soluble heavy metals from the flue ash with the acid condensate solution from the condensing step to produce a purified flue ash;

d. precipitating the soluble heavy metals extracted from the flue ash and the soluble heavy metals contained in the acid condensate solution by reaction thereof with a precipitation agent;

e. separating out the precipitated heavy metals in a solid-liquid separation system, whereby the soluble heavy metals are recovered in a compact and concentrated form;

f. neutralizing the acid condensate solution after precipitation of heavy metals therefrom by combining it with the alkali wash solution; and g. returning extracted flue ash and solid precipitates formed during neutralization to the combustion step where they are stabilized by being bound within the slag at the high temperatures of the combustion step.

11. The process recited in claim 10, wherein one kg or less of separated, precipitated heavy metals are recovered per ton of waste materials combusted.

* * * * *